United States Patent
Ambrus et al.

(10) Patent No.: US 10,134,174 B2
(45) Date of Patent: Nov. 20, 2018

(54) TEXTURE MAPPING WITH RENDER-BAKED ANIMATION

(71) Applicant: MICROSOFT TECHNOLOGY LICENSING, LLC, Redmond, WA (US)

(72) Inventors: Anthony Ambrus, Seattle, WA (US); Mike Boulton, Seattle, WA (US); Alexander J. Hogan, Mountlake Terrace, WA (US); Jeffrey Kohler, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/181,328

(22) Filed: Jun. 13, 2016

(65) Prior Publication Data
US 2017/0358120 A1    Dec. 14, 2017

(51) Int. Cl.
*G06T 15/04* (2011.01)
*G06T 15/60* (2006.01)
(Continued)

(52) U.S. Cl.
CPC .............. *G06T 15/04* (2013.01); *G06T 13/20* (2013.01); *G06T 15/60* (2013.01); *G06T 19/006* (2013.01)

(58) Field of Classification Search
CPC ....... G06T 19/006; G06T 13/00–13/80; G06T 15/04; G06T 15/50–15/87
See application file for complete search history.

(56) References Cited

U.S. PATENT DOCUMENTS 6,057,847 A    5/2000 Jenkins
6,866,585 B2    3/2005 Muir
(Continued)

FOREIGN PATENT DOCUMENTS

EP    1347418 A2    9/2003
EP    1465116 A1    10/2004
(Continued)

OTHER PUBLICATIONS

Flavell, Lance. Beginning Blender, "Chapter 10—Particles and Physics." Apress, 2010. 275-316.*
(Continued)

*Primary Examiner* — Daniel Hajnik
(74) *Attorney, Agent, or Firm* — Alleman Hall Creasman & Tuttle LLP

(57) ABSTRACT

A virtual-reality computing device comprises a pose sensor, a rendering tool, and a display. The pose sensor is configured to measure a current pose of the virtual-reality computing device in a physical space. The rendering tool is configured to receive a holographic animation of a 3D model that includes a sequence of holographic image frames. The rendering tool is also configured to receive a render-baked dynamic lighting animation that includes a sequence of lighting image frames corresponding to the sequence of holographic image frames. The rendering tool also is configured to derive a 2D view of the 3D model with a virtual perspective based on the current pose and texture map a corresponding lighting image frame to the 2D view of the 3D model to generate a rendered image frame of the 2D view with texture-mapped lighting. The display is configured to visually present the rendered image frame.

20 Claims, 7 Drawing Sheets

(51) Int. Cl.
*G06T 19/00* (2011.01)
*G06T 13/20* (2011.01)

(56) References Cited

U.S. PATENT DOCUMENTS

| | | | |
|---|---|---|---|
| 7,532,220 B2 | 5/2009 | Barenbrug et al. | |
| 8,451,270 B2 | 5/2013 | Boulton | |
| 2002/0050994 A1 | 5/2002 | Oka | |
| 2007/0195090 A1* | 8/2007 | Birdwell | G06T 15/50 345/426 |
| 2008/0074424 A1 | 3/2008 | Carignano | |
| 2011/0234587 A1 | 9/2011 | Maigret et al. | |
| 2013/0106674 A1* | 5/2013 | Wheeler | G02B 27/017 345/8 |
| 2015/0294492 A1 | 10/2015 | Koch et al. | |
| 2016/0148420 A1* | 5/2016 | Ha | G06T 15/50 345/426 |
| 2016/0292920 A1* | 10/2016 | Sprock | G06T 11/60 |

FOREIGN PATENT DOCUMENTS

| | | |
|---|---|---|
| WO | 2002039388 A2 | 5/2002 |
| WO | 2007012789 A1 | 2/2007 |
| WO | 2014087135 A1 | 6/2014 |
| WO | 15144209 A1 | 10/2015 |

OTHER PUBLICATIONS

Stefanov, Nikolay, "Global Illumination in Games", Published on: Oct. 2, 2015 Available at: http://fileadmin.cs.lth.se/cs/Education/EDAN35/lectures/Stefanov10-gi-in-games-notes.pdf.

Shen, et al., "Texture for Volume Character Animation", In Proceedings of the 3rd international conference on Computer graphics and interactive techniques in Australasia and South East Asia, Nov. 29, 2005, pp. 255-264.

"Image Textures", Published on: Feb. 20, 2015 Available at: htps://www.blender.org/manual/render/blender_render/textures/types/image.html.

* cited by examiner

TEXTURE MAPPING WITH RENDER-BAKED ANIMATION

BACKGROUND

A virtual-reality experience supplements and/or replaces a real-world environment with virtual imagery. In one example, a virtual-reality experience is provided to a user by a computing system that visually presents a virtual environment to the user's eye(s) via a near-eye display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A virtual-reality computing device comprises a pose sensor, a rendering tool, and a display. The pose sensor is configured to measure a current pose of the virtual-reality computing device in a physical space. The rendering tool is configured to receive a holographic animation of a 3D model that includes a sequence of holographic image frames. The rendering tool is also configured to receive a render-baked dynamic lighting animation that includes a sequence of lighting image frames corresponding to the sequence of holographic image frames. The rendering tool also is configured to derive a 2D view of the 3D model with a virtual perspective based on the current pose and texture map a corresponding lighting image frame to the 2D view of the 3D model to generate a rendered image frame of the 2D view with texture-mapped lighting. The display is configured to visually present the rendered image frame.

DETAILED DESCRIPTION

Figure 1A:
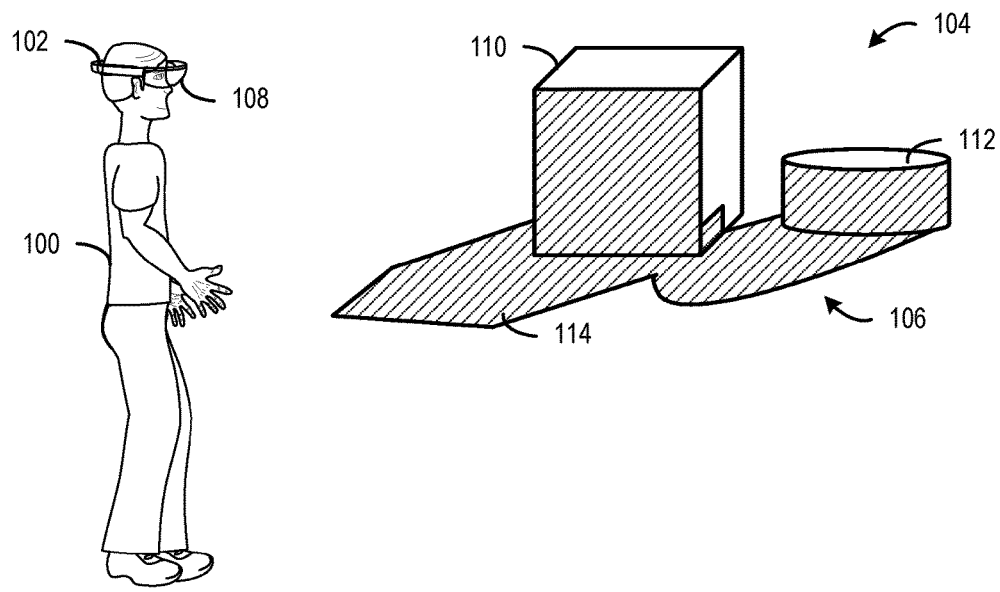
FIG. 1A shows a user viewing a holographic animation of a 3D model from a first pose in a physical environment via a virtual-reality computing device.

Producing high quality graphics on virtual-reality devices can be difficult due to bandwidth and processing limitations of virtual-reality hardware. In particular, visually presenting a 2D view of a holographic animation of a 3D model in which the 2D view has a virtual perspective that changes based on a pose of the virtual-reality computing device can be difficult. This is due to the virtual perspective of the 2D view dynamically changing as the pose of the virtual-reality computing device changes. In other words, the holographic animation cannot be fully rendered prior to runtime, such as with a holographic animation having a predetermined virtual perspective, because the virtual perspective is not known. Much of the difficulty associated with producing high quality graphics is due to the performance of computationally expensive calculations for dynamic lighting and/or other environmental effects. In particular, performing such calculations at runtime is so prohibitively resource expensive that such effects often cannot be achieved with suitable resolution and latency using typical mobile hardware.

Accordingly, the present description is directed to an approach for visually presenting a 2D view of a holographic animation of a 3D model with texture-mapped lighting. In such an approach, the 2D view may have a virtual perspective that changes based on a pose of a virtual-reality computing device. Further, in such an approach, a render-baked dynamic lighting animation including a sequence of lighting image frames may be texture lapped to corresponding holographic image frames of the holographic animation to generate rendered image frames that are visually presented via the display. To achieve this, lighting calculations for the entire holographic animation can be performed offline prior to runtime, and such calculated lighting information can be baked into the sequence of lighting image frames. Further, the process of compressing the individual lighting image frames into the render-baked dynamic lighting animation may effectively reduce the data stream to just frame-to-frame differences, making the resultant compressed animation a dense representation of the lighting information. Such an approach may reduce runtime resource costs related to lighting effects, because the cost of retrieving animation streams may be significantly less than the cost of performing equivalent lighting calculations. Such reductions may be particularly realized in configurations that have dedicated video decoder hardware.

Throughout the present description, references are made to lighting animations, lighting image frames, and lighting effects. However, it will be appreciated that the methods and processes described herein may apply to virtually any type of environmental effect that may be represented by a virtual-reality computing device, and not just lighting effects. For example, a render-baked dynamic lighting animation may be a single example of a render-baked dynamic environmental effect animation, which may be generated and texture-mapped to holographic image frames as described herein. Such an environmental effect animation may simulate at least one of a lighting effect, a fluid motion effect, and a gas particle motion effect, as examples.

FIG. 1A shows a user 100 wearing a virtual-reality computing device 102 in a physical environment 104. The user 100 is viewing a holographic animation 106 generated by a near-eye display 108 of the virtual-reality computing device 102. The near-eye display 108 may be at least partially see-through. As such, display light generated by the near-eye display 108 may be directed to the user's eye(s) while light from the physical environment 104 passes through the near-eye display 108 to the user's eye(s). As such, the user's eye(s) simultaneously receive ambient light from the physical environment 104 and display light generated by the near-eye display 108), thus creating an augmented or mixed reality experience. Alternatively, the near-eye display 108 may be opaque. Further, virtual-reality computing device 102 may change the virtual perspective of the holographic animation 106 as the real-world perspective of the physical space 104 changes.

The holographic animation 106 defines a three-dimensional (3D) model. The virtual-reality computing device 102 may be configured to world-lock the 3D model such that the 3D model appears to remain in a fixed location/pose in the physical environment 104, even as a pose (e.g., in six degrees of freedom (6DOF)) of the virtual-reality computing device 102 changes. In the depicted example, the user 100 is viewing the holographic animation 106 from a first location in the physical environment 104 in which the virtual-reality computing device 102 has a first pose. Specifically, the user 100 is standing on the left-side of the holographic animation 106 relative to the page.

In the depicted example, the holographic animation 106 of the 3D model includes a plurality of virtual objects in the form of a virtual block 110 and a virtual cylinder 112 that is spaced apart from the virtual block 110. The virtual block 110 and the virtual cylinder 112 are illuminated with virtual light to create a virtual shadow 114. The size, shape, position, and/or other properties of virtual block 110 and virtual cylinder 112 may dynamically change over a duration of the holographic animation (e.g., from frame to frame). Similarly, the lighting and shadow effects may change concomitantly with or independently from any changes in the depicted virtual objects. Note that the holographic animation 106 may only be seen by users of virtual-reality computing devices, such as the user 100 via the virtual-reality computing device 102.

Figure 1B:
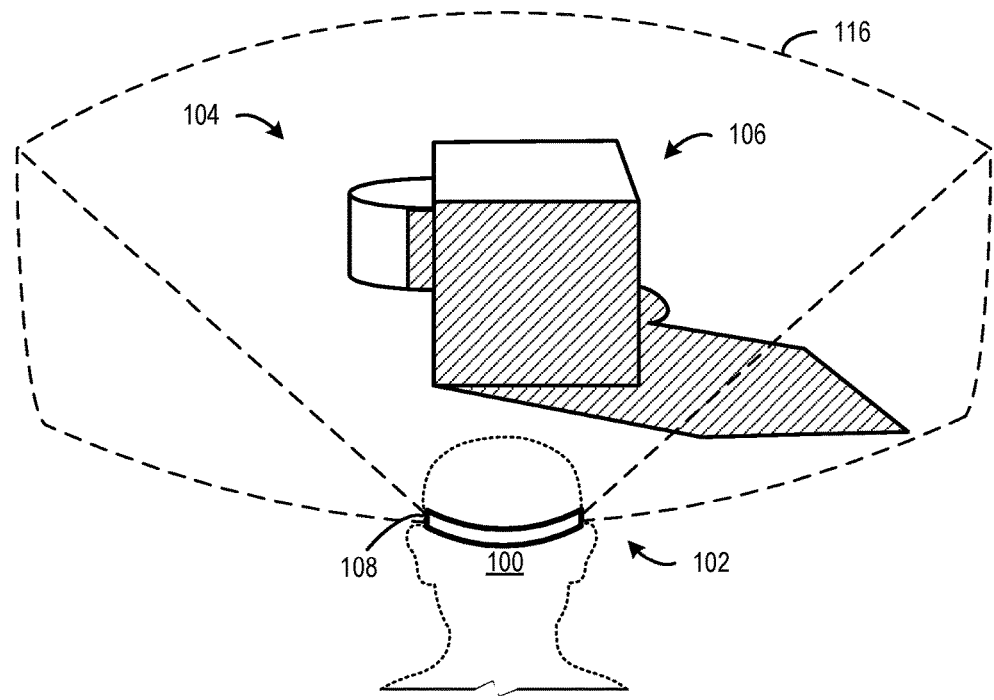
FIG. 1B shows the virtual-reality computing device visually presenting a view of the holographic animation with a first perspective corresponding to the first pose of FIG. 1A.

FIG. 1B shows a 2D view of the holographic animation 106 visually presented in a field of view 116 of the near-eye display 108. The 2D view of the virtual animation 106 is visually presented with a virtual perspective that is based on the pose of the virtual-reality computing device 102 in the physical environment 104. In particular, the virtual perspective of the holographic animation 106 from the first pose depicts the virtual block 110 as being closer to the user 100 than the virtual cylinder 112. Further, the virtual shadow 114 appears to be extending toward the user 100.

Figure 2A:
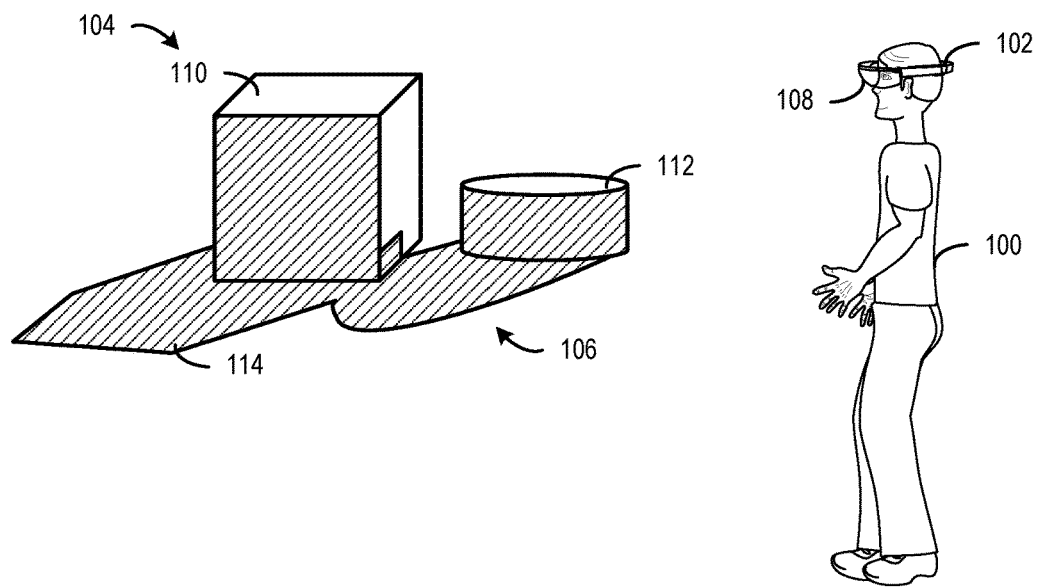
FIG. 2A shows the user viewing the holographic animation from a second pose in the physical environment via the virtual-reality computing device.

In FIG. 2A, the user 100 is viewing the holographic animation 106 from a second location that is different from the first location of FIG. 1A, and correspondingly the virtual-reality computing device 102 has a second pose that differs from the first pose of FIG. 1A. In particular, the user is standing on the right-side of the page relative to the holographic animation 106. Because the holographic animation 106 is world-locked, the pose of the holograph c animation 106 remains fixed even as the virtual-reality computing device 102 changes from the first pose to the second pose.

Figure 2B:
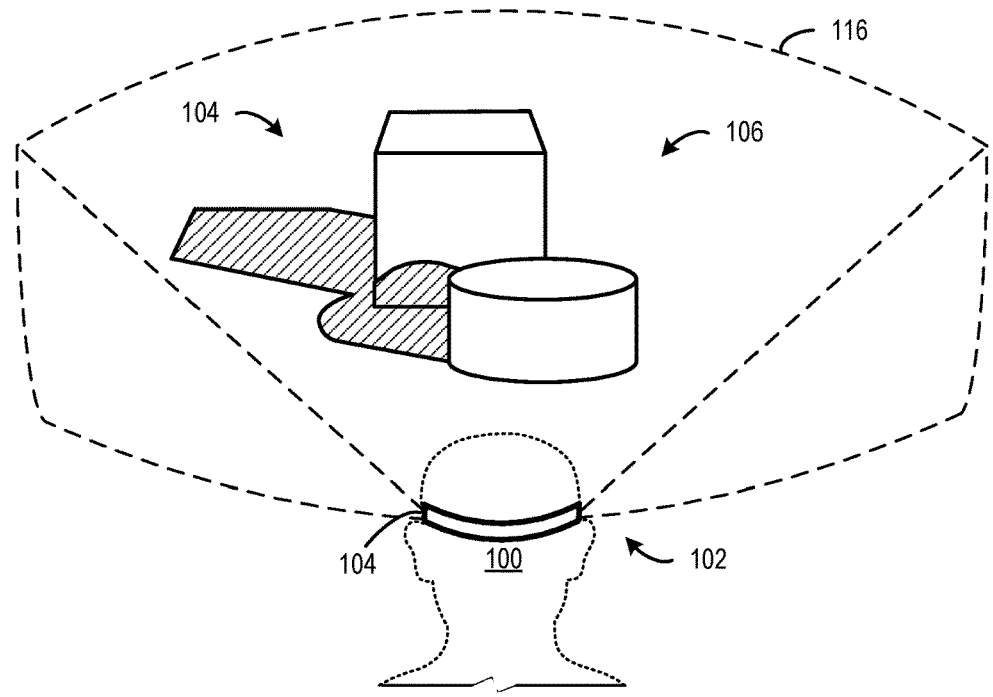
FIG. 2B shows the virtual-reality computing device visually presenting a view of the holographic animation with a second perspective corresponding to the second pose of FIG. 2A.

In FIG. 2B, the virtual-reality computing device 102 visually presents, in the field of view 116 of the near-eye display 108, a 2D view of the holographic animation 106 with a virtual perspective that is based on the second pose. In particular, the virtual perspective of the holographic animation 106 from the second pose depicts the virtual cylinder 112 as being closer to the user 100 than the virtual block 110. Further, the virtual shadow 114 appears to be extending away from the user 100.

Note that the depicted 2D views are meant to be non-limiting, and any suitable 2D view of the holographic animation 106 may be visually presented in the field of view 116 of the near-eye display 108.

As discussed above, in order to generate high quality graphics on a virtual-reality computing device having limited processing resources, environmental effects, such as lighting effects, can be calculated prior to runtime and baked into a separate render-baked dynamic lighting animation. At runtime, lighting image frames of the dynamic lighting animation can be texture mapped to corresponding holographic image frames of a holographic animation to generate rendered image frames having texture-mapped environmental effects.

Figure 3:
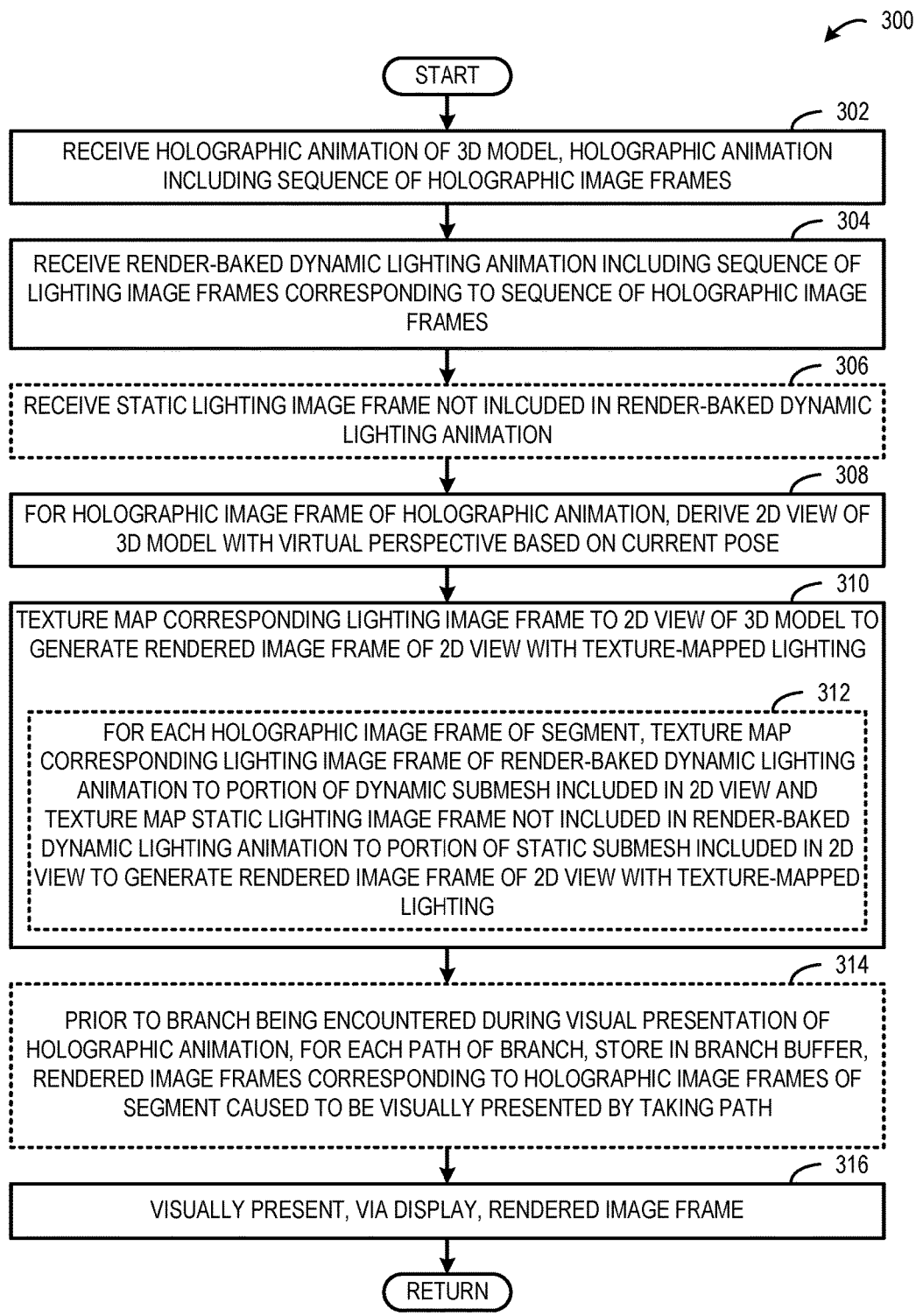
FIG. 3 shows an example method for visually presenting a holographic animation of a 3D model using a virtual-reality computing device.

An example method 300 for visually presenting a holographic animation of a 3D model with texture-mapped lighting is shown in FIG. 3. For example, the method 300 may be performed by the virtual-reality computing system 102 of FIGS. 1A and 2A, the virtual-reality computing system 700 of FIG. 7, or the computing system 800 of FIG. 8. In general, the method 300 may be performed by any computing device suitable for generating and/or displaying virtual reality content.

At 302, the method 300 includes receiving a holographic animation of a 3D model. A holographic animation as described herein may in some ways be similar to a traditional 2D or 3D animation, in that it includes a plurality of frames that are presented in a predetermined sequence. For example, a holograph animation such as holographic animation 106 may include a sequence of holographic image frames, each holographic image frame including 3D models, 3D objects, and/or texture elements, in some implementations, different aspects of a frame may be stored in different data structures. For example, a 3D model may be saved in a 3D model subframe, which cooperates with a separately saved texture map.

Figure 4:
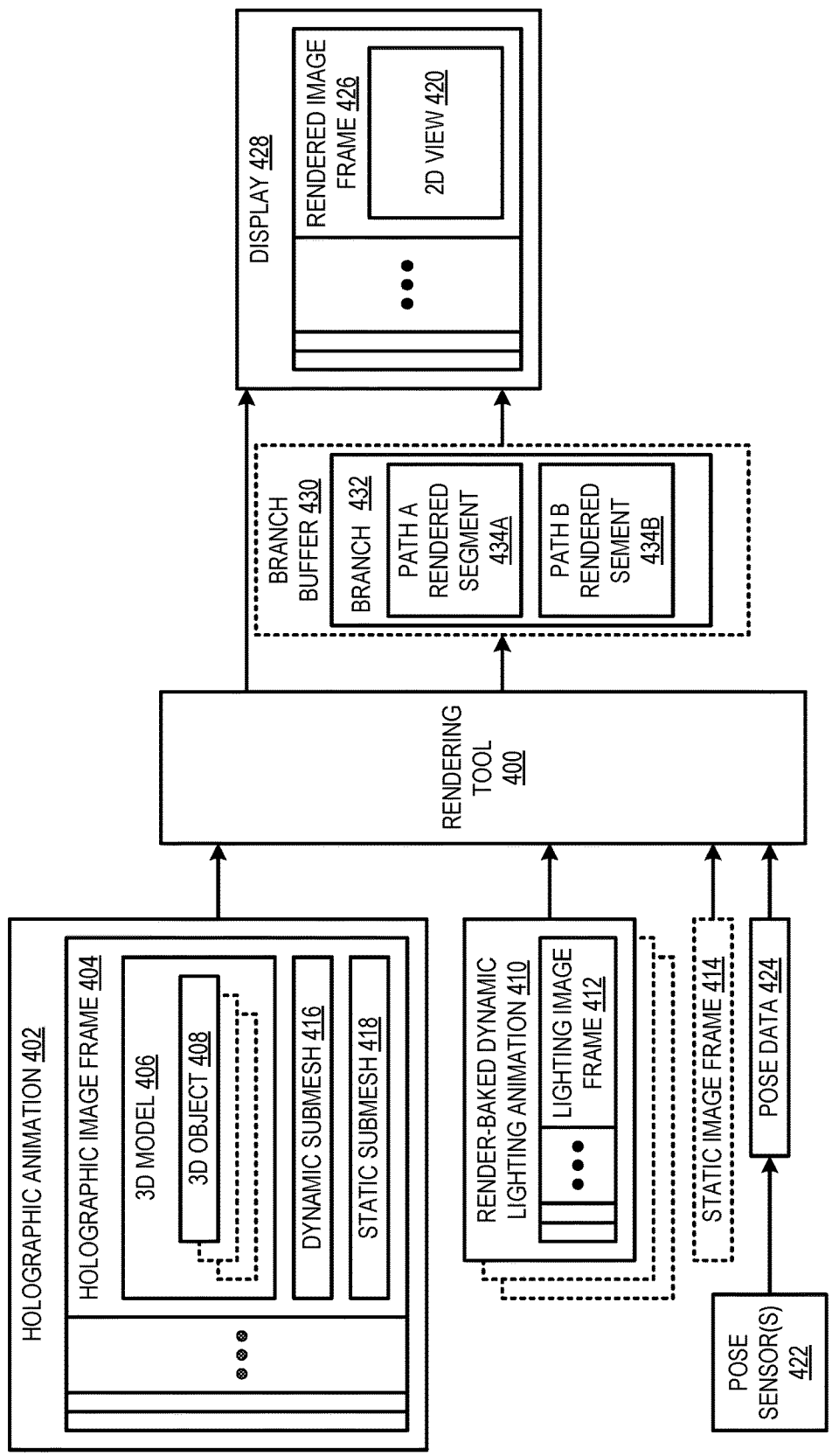
FIG. 4 schematically shows a rendering pipeline of a virtual-reality computing device.

Such holographic image frames may be passed to a rendering tool that prepares the holographic image frames for display. FIG. 4 shows an example rendering tool 400 that may be included in a virtual-reality computing device to visually present rendered image frames of a holographic animation with texture-mapped lighting. For example, the rendering tool 400 may be included in the virtual-reality computing device 102 of FIGS. 1A and 2A, a virtual-reality computing system 700 of FIG. 7, and a computing system 800 of FIG. 8. The rendering tool may include a logic machine, which may include hardware and/or software.

The rendering tool 400 may be configured to receive a holographic animation 402, the holographic animation including a sequence of holographic image frames 404 in the form of one or more data structures. Each holographic image frame 404 may include a 3D model 406, which may in turn include one or more 3D objects 408. For example, the one or more 3D objects 408 may be virtual objects in a virtual scene. In the example depicted in FIGS. 1A and 2A, the virtual objects of the holographic animation 106 include the virtual block 110 and the virtual cylinder 112. Each holographic image frame 404 includes a plurality of vertices that comprise the 3D model 406 in that holographic image frame 404. The plurality of vertices may be defined by vertex data including three-dimensional position data, orientation data, color data, texture data, lighting data, and/or other rendering data for every vertex in every holographic image frame 404 of the holographic animation 402. Frame-to-frame changes in the vertex data of the plurality of vertices characterize the animation of the 3D model 406 over the course of the holographic animation 402.

Returning to FIG. 3, at 304, the method 300 includes receiving a render-baked dynamic lighting animation including a sequence of lighting image frames corresponding to the sequence of holographic image frames. Lighting information for a 3D model, such as 3D model 406 shown in FIG. 4, may be calculated prior to playback of holographic animation 402 and used to construct a render-baked dynamic lighting animation 410. In particular, calculated lighting information may be baked into a sequence of lighting image frames 412 included in the render-baked dynamic lighting animation and corresponding to the sequence of holographic image frames 404. Such lighting calculations are possible because the behavior of the 3D model is predefined and known for the holographic animation 402. In some implementations, the lighting information may be baked into the render-baked dynamic lighting animation 410 separate from other texture information, such as color, albedo, dynamic effects and other texture information. In some implementations, the render-baked dynamic lighting animation and the holographic animation may have a same frame rate.

At 306, method 300 of FIG. 3 optionally includes receiving a static image lighting frame not included in the render-baked dynamic lighting animation. In some implementations, the holographic animation may include one or more segments where the lighting for a portion of each image frame in the segment does not change. Accordingly, rendering tool 400 shown in FIG. 4 may optionally receive a static image frame 414, corresponding to such a segment. In some such implementations, for that segment of the holographic animation, the holographic image frames may be divided into a dynamic submesh 416 and a static submesh 418. The dynamic submesh may have lighting characteristics that change during the segment (e.g., frame to frame) and the static submesh may have lighting characteristics that do not change or are static (e.g., movement that is less than a threshold distance) during the segment. In other implementations, the static lighting image frame may be included in the render-baked dynamic lighting animation, and the static lighting image frame may correspond to multiple holographic image frames of the holographic animation. In particular, the lighting image frame may correspond to a static submesh that is included in the multiple holographic image frames.

At 308, method 300 of FIG. 3 includes, for a holographic image frame of the holographic animation, deriving a 2D view of the 3D model with a virtual perspective based on a current pose of the virtual-reality computing device in a physical space. This may be performed by rendering tool 400 shown in FIG. 4, for example. In particular, the rendering tool 400 may be configured to, for a holographic image frame 404 of the holographic animation 402, derive a 2D view 420 of the 3D model 406 with a virtual perspective based on a current pose of the virtual-reality computing device. The 2D view 420 may include a plurality of pixels corresponding to the portion of the 3D model 406 that is visible from the virtual perspective. The rendering tool 400 may be configured to color the plurality of pixels based on vertex data of the model 406.

As described above, the rendering tool 400 may derive a 2D view of a 3D model with a virtual perspective based on a current pose of the virtual-reality computing device. The current pose may be measured via one or more pose sensors of the virtual-reality computing device, such as the one or more pose sensors 422 shown in FIG. 4. Rendering tool 400 may be configured to receive pose data 424 from the one or more pose sensors 422 of a virtual-reality computing device. The one or more pose sensors 422 may include any suitable type of sensors including, but not limited to, an inertial measurement unit (IMU), an optical sensor (e.g., visible light camera, depth camera), a magnetometer, and/or a global position system (GPS) sensor. In one example, the pose data 424 is a continuously updated data stream that indicates a current state of the virtual-reality computing device. The rendering tool 400 may be configured to determine a current pose (e.g., in 6DOF) of the virtual-reality computing device from the pose data 424 or the current pose may be calculated upstream and passed to the rendering tool 400 as pose data 424.

At 310, the method 300 of FIG. 3 includes texture mapping a corresponding lighting image frame to the 2D view of the 3D model to generate a rendered image frame of the 2D view with texture-mapped lighting. For example, as described above, each lighting image frame 412 shown in FIG. 4 may correspond to a holographic image frame 404, and the rendering tool may be configured to, for each holographic image frame 404, derive a 2D view 420 of the 3D model 406 based on a current pose of the virtual-reality computing device. The rendering tool 400 may then, for each 2D view 420, texture map a corresponding lighting image frame 412 to the 2D view 420 to generate a rendered image frame 426 with texture-mapped lighting. Such rendered image frames may then be visually presented via a display 428. The rendering tool 400 may be configured to repeat this process in order to visually present any of the holographic image frames 404 of the holographic animation 402.

In some implementations where the 3D model 406 includes a plurality of 3D objects 408, the rendering tool 400 may be configured to texture map the same lighting image frame 412 to portions of all of the 3D objects 408 that are included in the 2D view 420. In other implementations, the rendering tool 400 may be configured to receive a plurality of different render-baked lighting animations 410 that may be texture mapped to the holographic animation 402. In one example, the rendering tool 400 may be configured to, for a given holographic image frame 404, texture map lighting image frames 412 of different render-baked lighting animations 410 to different 3D objects 408 of the 3D model 406. In another example, the rendering tool 400 may be configured to texture map lighting image frames 412 of different render-baked lighting animations 410 to different segments of the sequence of holographic image frames 404.

In some implementations where the holographic animation includes one or more segments having a dynamic submesh and a static submesh, at 312, the method 300 of FIG. 3 optionally may include, for each holographic image frame of the segment, texture mapping a corresponding lighting image frame of the render-baked dynamic lighting animation to a portion of the dynamic submesh included in the 2D view, and texture mapping the static lighting image frame to a portion of the static submesh included in the 2D view. This may result in a rendered image frame of the 2D view with texture-mapped lighting. The static lighting image may be used to add texture-mapped lighting to a portion of the static submesh included in each of the rendered image frames corresponding to the segment, because the lighting characteristics of the static submesh do not change from frame to frame for the segment.

In some implementations, the rendering tool 400 receives the holographic animation 402 and/or the render-baked dynamic lighting animation 410 from a local storage machine of the virtual-reality computing device. In some implementations, the rendering tool 400 receives the holographic animation 402 and/or the render-baked dynamic lighting animation 410 from a remote computing system. In such an example, the holographic animation 402 and/or the render-baked dynamic lighting animation 410 may be sent or streamed to the virtual-reality computing device and provided to the rendering tool 400.

In some implementations, the virtual-reality computing device may include a branch buffer, such as branch buffer 430 shown in FIG. 4, and the holographic animation may include one or more branches, such as branch 432. Each branch may include a plurality of different paths, and each path may be configured to cause a different segment of the holographic animation to be visually presented via a display. For example, different segments of the holographic animation may be visually presented based on user input provided at a branch. In particular, the user input may determine which path is taken at the branch and therefore which segment of the holographic animation is visually presented. For example, at one or more selected moments during a holographic animation (i.e., branches), user input may cause the virtual-reality computing device to present one particular animation segment over another, as defined by the path selected at the branch.

Accordingly, at 314, the method 300 of FIG. 3 optionally may include, prior to a branch being encountered during visual presentation of the holographic animation, for each path of the branch, storing, in a branch buffer, rendered image frames corresponding to holographic image frames of the segment caused to be visually presented by taking the path. For example, branch buffer 430 of FIG. 4 includes rendered segments 434A and 434B of holographic animation 402. Each of rendered segments 434A and 434B is associated with a different path of branch 432, and each may be stored in branch buffer 430 prior to branch 432 being encountered during visual presentation of the holographic animation. By preloading the segments of rendered image frames for each path of the branch into the branch buffer, the segment may be visually presented with little or no lag.

Further, in some implementations, the rendered image frames corresponding to the holographic image frames of the segments associated with paths that are less likely to be taken may be generated at a lower resolution and/or frame rate and the rendered image frames corresponding to the holographic image frames of the segments associated with paths that are more likely to be taken may be generated at a higher resolution and/or frame rate. By generating the rendered image frames that are less likely to be visually presented at a lower resolution and/or frame rate, available storage resources of the branch buffer may be increased.

At 316, the method 300 of FIG. 3 includes visually presenting, via a display, the rendered image frame. This step may be repeated for each frame of the holographic animation in order to visually present the holographic animation. In some implementations, this step may be repeated for different segments of the holographic animation based on encountering branches in the holographic animation. For example, FIG. 4 shows a display 428, which may be an integral part of a virtual-reality computing device, such as near-eye display 108 shown in FIG. 1A, and/or any other suitable display device operatively coupled with a virtual-reality computing device and usable to display holographic animations. After texture-mapping a lighting image frame 412 to a 2D view 420 to generate a rendered image frame 426, the rendered image frame 426 may be displayed by display 428. The rendering tool 400 may be configured to repeat this process in order to visually present any of the holographic image frames 404 of the holographic animation 402.

Figure 5:
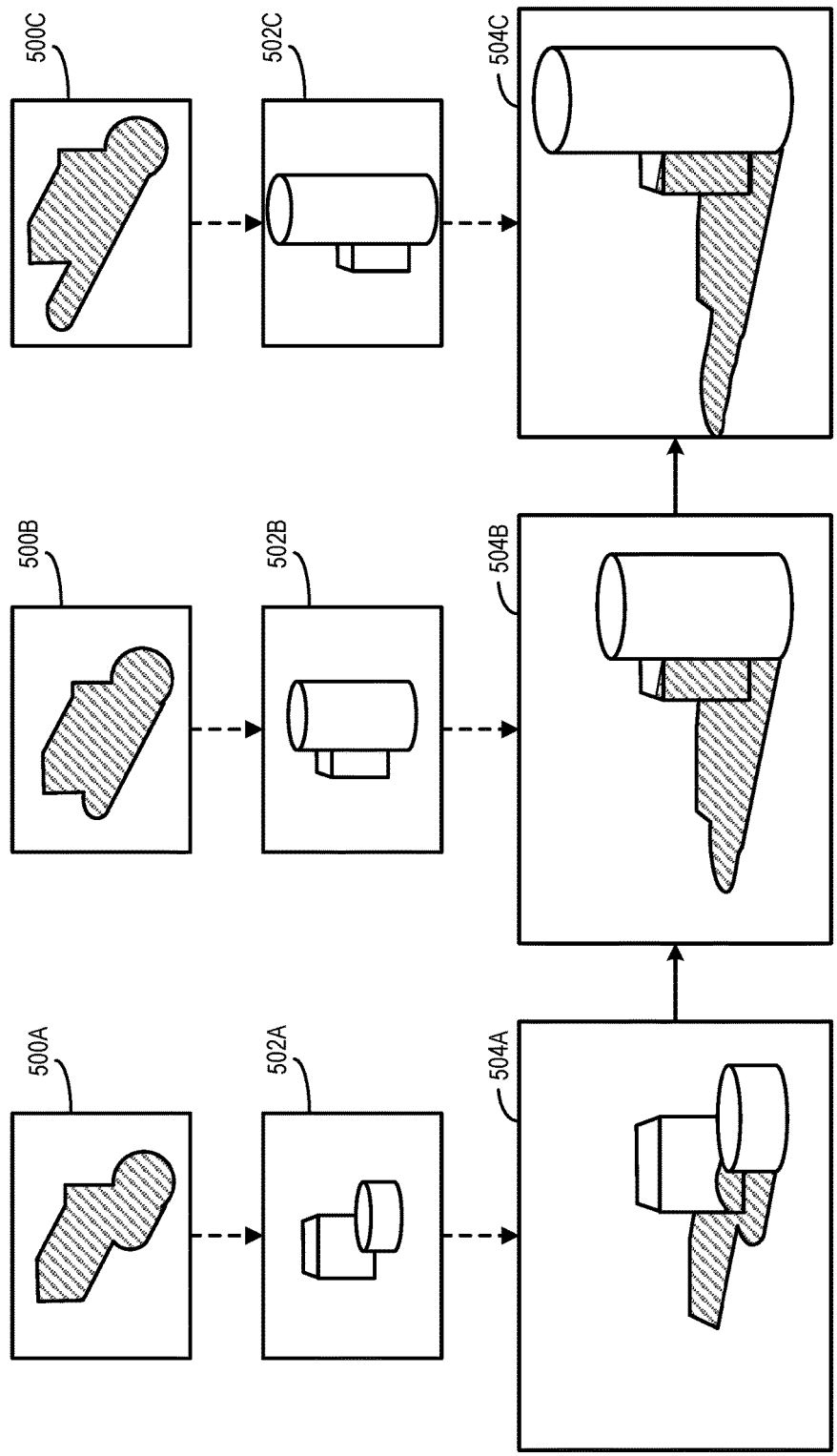
FIG. 5 shows a sequence of rendered image frames of a holographic animation texture mapped with a corresponding sequence of lighting image frames of a render-baked dynamic lighting animation.

The process of texture mapping a lighting image frame to a rendered 2D view of a 3D model included in a holographic image frame is schematically illustrated in FIG. 5. Specifically, FIG. 5 schematically shows a series of lighting image frames 500A, 500B, and 500C. Lighting image frames 500 may be, for example, lighting image frames included in a render-baked dynamic lighting animation, such as dynamic lighting animation 410 shown in FIG. 4. Each lighting image frame 500 may include lighting information for a 3D model, such as 3D model 406 shown in FIG. 4, which may be calculated prior to a runtime of a holographic animation. In some implementations, lighting information included in each lighting frame may be organized according to a coordinate system, which may or may not correspond to a three-dimensional coordinate system utilized by holographic image frames. For example, a lighting image frame may be organized according to a UV coordinate system, where coordinate values on each axis range from 0 to 1.

Each lighting image frame 500 may be texture mapped to a corresponding 2D view, such as 2D views 502A, 502B, and 502C shown in FIG. 5. 2D views 502 may be derived from 3D models included in holographic image frames based on a current perspective of a virtual-reality computing device, as described above. In particular, each 2D view 502 shown in FIG. 5 may correspond to a different holographic image frame including a 3D model of one or more 3D objects. These holographic image frames may be holographic image frames from a holographic animation, for example, and include a 3D model of one or more 3D objects. 2D views 502 may be derived from such holographic image frames by a rendering tool of a virtual-reality computing device, such as rendering tool 400 shown in FIG. 4.

As described above, a lighting image frame may be texture mapped to a derived 2D view to generate a rendered image frame of the 2D view with texture-mapped lighting. For example, lighting image frame 500A may be texture mapped to 2D view 502A to generate rendered image frame 504A, which shows 2D view 502A with texture-mapped lighting effects. Rendered image frames 504B and 504C may be generated in a substantially similar manner. Rendered image frames 504 may be presented via a display of a virtual-reality computing device in a predetermined order. For example, rendered image frames 504 may be sequentially presented to a user of a virtual-reality computing device, giving the illusion that the virtual cylinder shown in the rendered image frames 504 grows over time.

Figure 6:
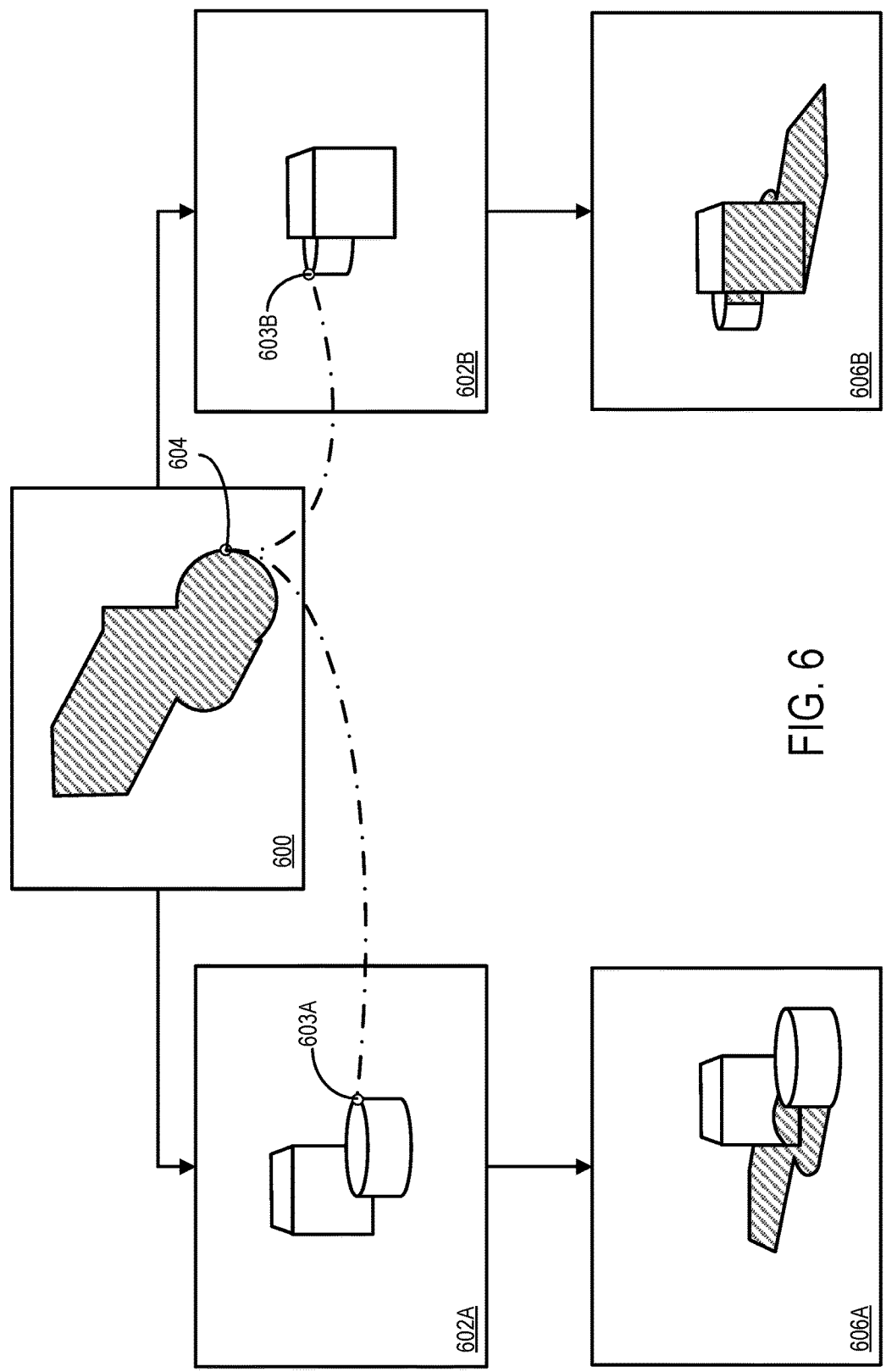
FIG. 6 shows a corresponding lighting image frame texture mapped to different 2D views of the same holographic image frame.

The process of texture lapping a lighting image frame to a derived 2D view of a 3D model is schematically illustrated in FIG. 6, which schematically shows an example lighting image frame 600. As described above, a 2D view may be derived from a 3D model of a holographic image frame based on a current pose of a virtual-reality computing device. In other words, for a given 3D model, a different 2D view may be derived depending on the current pose. As an example, FIG. 6 shows 2D views 602A and 602B, each derived for the same 3D model of the same holographic image frame. 2D view 602A is derived for a first pose of a virtual-reality computing device, while 2D view 602B is derived for a second, alternative view of a virtual-reality computing device. Specifically, 2D view 602A shows the virtual cylinder in front of the virtual block, while 2D view 602B shows the virtual block in front of the virtual cylinder.

As described above, a lighting image frame may be organized according to a UV or other suitable coordinate system, while pixels in a 2D view may be organized according to XY or other coordinate system. As shown, 2D view 602A includes pixel 603A, while 2D view 602B includes pixel 603B. Each of pixels 603A and 603B correspond to the same virtual location in 3D space (i.e., a spot on an upper edge of the virtual cylinder), though have different 2D coordinates relative to 2D views 602A and 602B based on the difference in virtual perspective of the 2D views. Accordingly, each of pixels 603A and 603B may be texture mapped to lighting image frame location 604, which includes lighting information for the virtual location represented by pixels 603A and 6039. Lighting image frame location 604 may be defined by lighting image frame coordinates, expressed via a LIV coordinate system and saved as part of pixels 603A and 603B, for example. In general, each pixel of a 2D view may be texture mapped to coordinates of a corresponding lighting image frame, allowing lighting effects to be applied to a 2D view based on a current pose of a virtual-reality computing device.

Lighting image frame 600 may be texture mapped to 2D views 602A and 602B to generate rendered image frames 606A and 606B. As shown in FIG. 6, rendered image frames 606A and 606B respectively include 2D views 602A and 602B with texture-mapped lighting effects. As with rendered image frames described above, rendered image frames 606A and 606B may be presented via a display of a virtual-reality computing device as part of a holographic animation.

Figure 7:
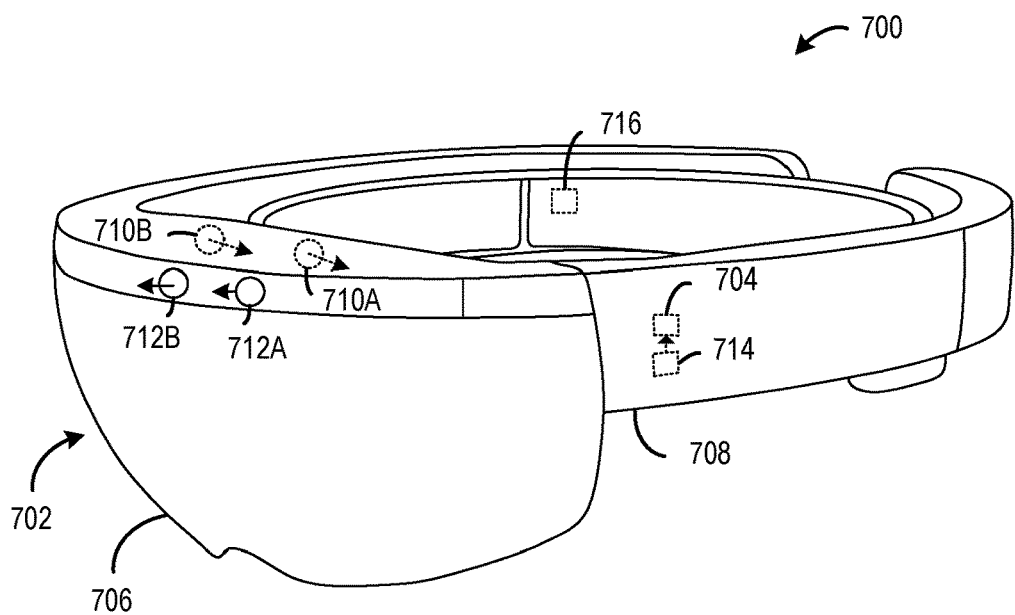
FIG. 7 shows an example virtual-reality computing system.

FIG. 7 shows aspects of an example virtual-reality computing system 700 including a near-eye display 702. The virtual-reality computing system 700 is a non-limiting example of the virtual-reality computing system 102 shown in FIG. 1 and/or the computing system 800 shown in FIG. 8.

The virtual-reality computing system 700 may be configured to present any suitable type of virtual-reality experience. In some implementations, the virtual-reality experience includes a totally virtual experience in which the near-eye display 702 is opaque, such that the wearer is completely absorbed in the virtual-reality imagery provided via the near-eye display 702.

In some implementations, the virtual-reality experience includes an augmented-reality experience in which the near-eye display 702 is wholly or partially transparent from the perspective of the wearer, to give the wearer a clear view of a surrounding physical space. In such a configuration, the near-eye display 702 is configured to direct display light to the user's eye(s) so that the user will see augmented-reality objects that are not actually present in the physical space. In other words, the near-eye display 702 may direct display light to the user's eye(s) while light from the physical space passes through the near-eye display 702 to the user's eye(s). As such, the user's eye(s) simultaneously receive light from the physical environment and display light.

In such augmented-reality implementations, the virtual-reality computing system 700 may be configured to visually present augmented-reality objects that appear body-locked and/or world-locked. A body-locked augmented-reality object may appear to move along with a perspective of the user as a pose (e.g., six degrees of freedom (DOF): x, y, z, yaw, pitch, roll) of the virtual-reality computing system 700 changes. As such, a body-locked, augmented-reality object may appear to occupy the same portion of the near-eye display 702 and may appear to be at the same distance from the user, even as the user moves in the physical space. Alternatively, a world-locked, augmented-reality object may appear to remain in a fixed location in the physical space, even as the pose of the virtual-reality computing system 700 changes. When the virtual-reality computing system 700 visually presents world-locked, augmented-reality objects, such a virtual-reality experience may be referred to as a mixed-reality experience.

In some implementations, the opacity of the near-eye display 702 is controllable dynamically via a dimming filter. A substantially see-through display, accordingly, may be switched to full opacity for a fully immersive virtual-reality experience.

The virtual-reality computing system 700 may take any other suitable form in which a transparent, semi-transparent, and/or non-transparent display is supported in front of a viewer's eye(s). Further, implementations described herein may be used with any other suitable computing device, including but not limited to wearable computing devices, mobile computing devices, laptop computers, desktop computers, smart phones, tablet computers, etc.

Any suitable mechanism may be used to display images via the near-eye display 702. For example, the near-eye display 702 may include image-producing elements located within lenses 706. As another example, the near-eye display 702 may include a display device, such as a liquid crystal on silicon (LCOS) device or OLED microdisplay located within a frame 708. In this example, the lenses 706 may serve as, or otherwise include, a light guide for delivering light from the display device to the eyes of a wearer. Additionally or alternatively, the near-eye display 702 may present left-eye and right-eye virtual-reality images via respective left-eye and right-eye displays.

The virtual-reality computing system 700 includes an on-board computer 704 configured to perform various operations related to receiving user input gesture recognition, eye gaze detection), visual presentation of virtual-reality images on the near-eye display 702, and other operations described herein. In some implementations, some to all of the computing functions described above, may be performed off board. For example, rendering tool 400 may not be part of the virtual-reality computing system.

The virtual-reality computing system 700 may include various sensors and related systems to provide information to the on-board computer 704. Such sensors may include, but are not limited to, one or more inward facing image sensors 710A and 710B, one or more outward facing image sensors 712A and 712B, an inertial measurement unit (IMU) 714, and one or more microphones 716. The one or more inward facing image sensors 710A, 710B may be configured to acquire gaze tracking information from a wearer's eyes (e.g., sensor 710A may acquire image data for one of the wearer's eye and sensor 710B may acquire image data for the other of the wearer's eye).

The on-board computer 704 may be configured to determine gaze directions of each of a wearer's eyes in any suitable manner based on the information received from the image sensors 710A, 710B. The one or more inward facing image sensors 710A, 710B, and the on-board computer 704 may collectively represent a gaze detection machine configured to determine a wearer's gaze target on the near-eye display 702. In other implementations, a different type of gaze detector/sensor may be employed to measure one or more gaze parameters of the user's eyes. Examples of gaze parameters measured by one or more gaze sensors that may be used by the on-board computer 704 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or snore outward facing image sensors 712A, 712B may be configured to measure physical environment attributes of a physical space. In one example, image sensor 712A may include a visible-light camera configured to collect a visible-light image of a physical space. Further, the image sensor 712B may include a depth camera configured to collect a depth image of a physical space. More particularly, in one example, the depth camera is an infrared time-of-flight depth camera. In another example, the depth camera is an infrared structured light depth camera.

Data from the outward facing image sensors 712A, 712B may be used by the on-board computer 704 to detect movements, such as gesture-based inputs or other movements performed by a wearer or by a person or physical object in the physical space. In one example, data from the outward facing image sensors 712A, 712B may be used to detect a wearer input performed by the wearer of the virtual-reality computing system 700, such as a gesture. Data from the outward facing image sensors 712A, 712B may be used by the on-board computer 704 to determine direction/location and orientation data (e.g., from imaging environmental features) that enables position/motion tracking of the virtual-reality computing system 700 in the real-world environment. In some implementations, data from the outward facing image sensors 712A, 712B may be used by the on-board computer 704 to construct still images and/or video images of the surrounding environment from the perspective of the virtual-reality computing system 700.

The IMU 714 may be configured to provide position and/or orientation data of the virtual-reality computing system 700 to the on-board computer 704. In one implementation, the IMU 714 may be configured as a three-axis or three-degree of freedom (3DOF) position sensor system. This example position sensor system may, for example, include three gyroscopes to indicate or measure a change in orientation of the virtual-reality computing system 700 within 3D space about three orthogonal axes (e.g., roll, pitch, and yaw).

In another example, the IMU 714 may be configured as a six-axis or six-degree of freedom (6DOF) position sensor system. Such a configuration may include three accelerometers and three gyroscopes to indicate or measure a change in location of the virtual-reality computing system 700 along three orthogonal spatial axes (e.g., x, y, and z) and a change in device orientation about three orthogonal rotation axes (e.g., yaw, pitch, and roll). In some implementations, position and orientation data from the outward facing image sensors 712A, 712B and the IMU 714 may be used in conjunction to determine a position and orientation (or 6DOF pose) of the virtual-reality computing system 700.

The virtual-reality computing system 700 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 716 may be configured to measure sound in the physical space. Data from the one or more microphones 716 may be used by the on-board computer 704 to recognize voice commands provided by the wearer to control the virtual-reality computing system 700.

The on-board computer 704 may include a logic machine and a storage machine, discussed in more detail below with respect to FIG. 8, in communication with the near-eye display 702 and the various sensors of the virtual-reality computing system 700.

Figure 8:
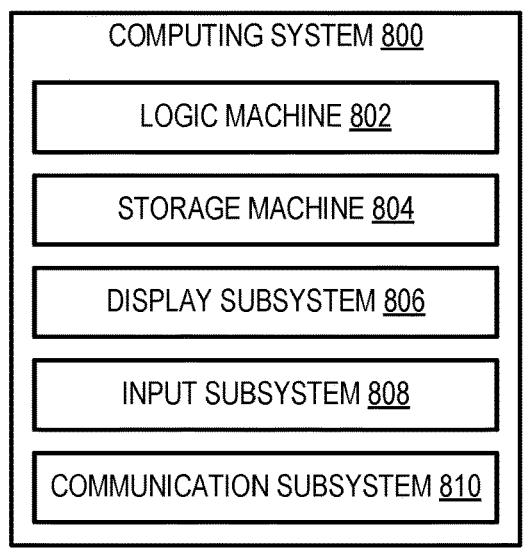
FIG. 8 shows an example computing system.

FIG. 8 schematically shows a non-limiting implementation of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices smart phone), virtual-reality devices, and/or other computing devices. For example, the computing system 800 may be a non-limiting example of the virtual-reality computing system 102 of FIG. 1 and/or the virtual-reality computing system 700 of FIG. 7.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices. As a non-limiting example, display subsystem 806 may include the near-eye displays described above.

When included, input subsystem 808 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem 810 may allow computing system 800 to send and/or receive messages to and/or from other devices via a network such as the Internet.

In an example, a virtual-reality computing device comprises: a pose sensor configured to measure a current pose of the virtual-reality computing device in a physical space; a rendering tool configured to: receive a holographic animation of a 3D model, the holographic animation including a sequence of holographic image frames; receive a render-baked dynamic lighting animation including a sequence of lighting image frames corresponding to the sequence of holographic image frames; for a holographic image frame of the holographic animation, derive a 2D view of the 3D model with a virtual perspective based on the current pose; and texture map a corresponding lighting image frame to the 2D view of the 3D model to generate a rendered image frame of the 2D view with texture-mapped lighting; and a display configured to visually present the rendered image frame. In this example or any other example, the 3D model includes a plurality of 3D objects, and the rendering tool is configured to texture map the same lighting image frame to two or more of the 3D objects included in the 2D view. In this example or any other example, the virtual-reality computing device further comprises a branch buffer, and the holographic animation includes one or more branches including a plurality of different paths, each path being configured to cause a different segment of the holographic animation to be visually presented via the display, and the rendering tool is configured to, prior to the one or more branches being encountered during visual presentation of the holographic animation, for two or more paths of the one or more branches, store, in the branch buffer, rendered image frames corresponding to holographic image frames of the segment caused to be visually presented by taking the path. In this example or any other example, the rendered image frames corresponding to the holographic image frames of the segments associated with paths that are less likely to be taken are generated at a lower resolution and the rendered image frames corresponding to the holographic image frames of the segments associated with paths that are more likely to be taken are generated at a higher resolution. In this example or any other example, holographic image frames of a segment of the holographic animation each include a dynamic submesh and a static submesh, the dynamic submesh having lighting characteristics that change during the segment and the static submesh having lighting characteristics that are static during the segment, and the rendering tool is configured to, for each holographic image frame of the segment, texture map a corresponding lighting image frame of the render-baked dynamic lighting animation to a portion of the dynamic submesh included in the 2D view and texture map a static lighting image frame not included in the render-baked dynamic lighting animation to a portion of the static submesh included in the 2D view to generate a rendered image frame of the 2D view with texture-mapped lighting. In this example or any other example, each pixel of the 2D view is texture mapped to coordinates of the corresponding lighting image frame. In this example or any other example, the render-baked dynamic lighting animation and the holographic animation have a same frame rate. In this example or any other example, the display is an opaque, near-eye display. In this example or any other example, the display is a near-eye display configured to direct display light to a user's eye while light from the physical space passes through the display to the user's eye.

In an example, on a virtual-reality computing device, a method for visually presenting a holographic animation of a 3D model with texture-mapped lighting comprises: receiving a holographic animation of a 3D model, the holographic animation including a sequence of holographic image frames; receiving a render-baked dynamic lighting animation including a sequence of lighting image frames corresponding to the sequence of holographic image frames; for a holographic image frame of the holographic animation, deriving a 2D view of the 3D model with a virtual perspective based on a current pose of the virtual-reality computing device in a physical space, the current pose measured via a pose sensor of the virtual-reality computing device; texture mapping a corresponding lighting image frame to the 2D view of the 3D model to generate a rendered image frame of the 2D view with texture-mapped lighting; and visually presenting, via a display, the rendered image frame. In this example or any other example, the 3D model includes a plurality of 3D objects, and all of the 3D objects included in the 2D view are texture mapped with a same lighting image frame. In this example or any other example, the holographic animation includes one or more branches including a plurality of different paths, each path being configured to cause a different segment of the holographic animation to be visually presented via the display, and the method further comprises, prior to the one or more branches being encountered during visual presentation of the holographic animation, for each path of the one or more branches, storing, in a branch buffer, rendered image frames corresponding to holographic image frames of the segment caused to be visually presented by taking the path. In this example or any other example, the rendered image frames corresponding to the holographic image frames of the segments associated with paths that are less likely to be taken are generated at a lower resolution and the rendered image frames corresponding to the holographic image frames of the segments associated with paths that are more likely to be taken are generated at a higher resolution. In this example or any other example, holographic image frames included in a segment of the holographic animation each include a dynamic submesh and a static submesh, the dynamic submesh having lighting characteristics that change during the segment and the static submesh having lighting characteristics that are static during the segment, and the method further comprises, for each holographic image frame of the segment, texture mapping a corresponding lighting image frame of the render-baked dynamic lighting animation to a portion of the dynamic submesh included in the 2D view and texture mapping a static lighting image frame not included in the render-baked dynamic lighting animation to a portion of the static submesh included in the 2D view to generate a rendered image frame of the 2D view with texture-mapped lighting.

In an example, a virtual-reality computing device comprises: a pose sensor configured to measure a current pose of the virtual-reality computing device in a physical space; a rendering tool configured to: receive a holographic animation of a 3D model, the holographic animation including a sequence of holographic image frames; receive a render-baked dynamic environmental effect animation including a sequence of environmental effect frames corresponding to the sequence of holographic image frames; for a holographic image frame of the holographic animation, derive a 2D view of the 3D model with a virtual perspective based on the current pose; and texture map a corresponding environmental effect image frame to the 2D view of the 3D model to generate a rendered image frame of the 2D view with texture-mapped environmental effects; and a display configured to visually present the rendered image frame. In this example or any other example, the render-baked dynamic environmental effect animation simulates a lighting effect. In this example or any other example, the render-baked dynamic environmental effect animation simulates a fluid motion effect. In this example or any other example, the render-baked dynamic environmental effect animation simulates a gas particle motion effect. In this example or any other example, the 3D model includes a plurality of 3D objects, and the rendering tool is configured to texture map the same environmental effect image frame to all of the 3D objects included in the 2D view. In this example or any other example, the render-baked dynamic environmental effect animation and the holographic animation have a same frame rate.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A virtual-reality computing device, comprising:
a pose sensor configured to measure a current pose of the virtual-reality computing device in a physical space;
a rendering tool configured to:
receive a holographic animation of a 3D model, the holographic animation including a sequence of holographic image frames;
receive a render-baked dynamic lighting animation including a sequence of lighting image frames corresponding to the sequence of holographic image frames, each lighting image frame specifying lighting conditions at a plurality of 3D coordinates of the 3D model;
for a holographic image frame of the holographic animation, derive a 2D view of the 3D model with a virtual perspective based on the current pose; and
texture map a corresponding lighting image frame to the 2D view of the 3D model to generate a rendered image frame of the 2D view with texture-mapped lighting; and
a display configured to visually present the rendered image frame.

2. The virtual-reality computing device of claim 1, wherein the 3D model includes a plurality of 3D objects, and wherein the rendering tool is configured to texture map the same lighting image frame to two or more of the 3D objects included in the 2D view.

3. The virtual-reality computing device of claim 1, further comprising a branch buffer, and wherein the holographic animation includes one or more branches including a plurality of different paths, each path being configured to cause a different segment of the holographic animation to be visually presented via the display, and wherein the rendering tool is configured to, prior to the one or more branches being encountered during visual presentation of the holographic animation, for two or more paths of the one or more branches, store, in the branch buffer, rendered image frames corresponding to holographic image frames of the segment caused to be visually presented by taking the path.

4. The virtual-reality computing device of claim 3, wherein the rendered image frames corresponding to the holographic image frames of the segments associated with paths that are less likely to be taken are generated at a lower resolution and wherein the rendered image frames corresponding to the holographic image frames of the segments associated with paths that are more likely to be taken are generated at a higher resolution.

5. The virtual-reality computing device of claim 1, wherein holographic image frames of a segment of the holographic animation each include a dynamic submesh and a static submesh, the dynamic submesh having lighting characteristics that change during the segment and the static submesh having lighting characteristics that are static during the segment, and wherein the rendering tool is configured to, for each holographic image frame of the segment, texture map a corresponding lighting image frame of the render-baked dynamic lighting animation to a portion of the dynamic submesh included in the 2D view and texture map a static lighting image frame not included in the render-baked dynamic lighting animation to a portion of the static submesh included in the 2D view to generate a rendered image frame of the 2D view with texture-mapped lighting.

6. The virtual-reality computing device of claim 1, wherein each pixel of the 2D view is texture mapped to coordinates of the corresponding lighting image frame.

7. The virtual-reality computing device of claim 1, wherein the render-baked dynamic lighting animation and the holographic animation have a same frame rate.

8. The virtual-reality computing device of claim 1, wherein the display is an opaque, near-eye display.

9. The virtual-reality computing device of claim 1, wherein the display is a near-eye display configured to direct display light to a user's eye while light from the physical space passes through the display to the user's eye.

10. On a virtual-reality computing device, a method for visually presenting a holographic animation of a 3D model with texture-mapped lighting, the method comprising:
   receiving a holographic animation of a 3D model, the holographic animation including a sequence of holographic image frames;
   receiving a render-baked dynamic lighting animation including a sequence of lighting image frames corresponding to the sequence of holographic image frames, each lighting image frame specifying lighting conditions at a plurality of 3D coordinates of the 3D model;
   for a holographic image frame of the holographic animation, deriving a 2D view of the 3D model with a virtual perspective based on a current pose of the virtual-reality computing device in a physical space, the current pose measured via a pose sensor of the virtual-reality computing device;
   texture mapping a corresponding lighting image frame to the 2D view of the 3D model to generate a rendered image frame of the 2D view with texture-mapped lighting; and
   visually presenting, via a display, the rendered image frame.

11. The method of claim 10, wherein the 3D model includes a plurality of 3D objects, and wherein all of the 3D objects included in the 2D view are texture mapped with a same lighting image frame.

12. The method of claim 10, wherein the holographic animation includes one or more branches including a plurality of different paths, each path being configured to cause a different segment of the holographic animation to be visually presented via the display, and wherein the method further comprises, prior to the one or more branches being encountered during visual presentation of the holographic animation, for each path of the one or more branches, storing, in a branch buffer, rendered image frames corresponding to holographic image frames of the segment caused to be visually presented by taking the path.

13. The method of claim 12, wherein the rendered image frames corresponding to the holographic image frames of the segments associated with paths that are less likely to be taken are generated at a lower resolution and wherein the rendered image frames corresponding to the holographic image frames of the segments associated with paths that are more likely to be taken are generated at a higher resolution.

14. The method of claim 10, wherein holographic image frames included in a segment of the holographic animation each include a dynamic submesh and a static submesh, the dynamic submesh having lighting characteristics that change during the segment and the static submesh having lighting characteristics that are static during the segment, and wherein the method further comprises, for each holographic image frame of the segment, texture mapping a corresponding lighting image frame of the render-baked dynamic lighting animation to a portion of the dynamic submesh included in the 2D view and texture mapping a static lighting image frame not included in the render-baked dynamic lighting animation to a portion of the static submesh included in the 2D view to generate a rendered image frame of the 2D view with texture-mapped lighting.

15. A virtual-reality computing device, comprising:
   a pose sensor configured to measure a current pose of the virtual-reality computing device in a physical space;
   a rendering tool configured to:
      receive a holographic animation of a 3D model, the holographic animation including a sequence of holographic image frames;
      receive a render-baked dynamic environmental effect animation including a sequence of environmental effect frames corresponding to the sequence of holographic image frames, each environmental effect frame specifying environmental effects at a plurality of 3D coordinates of the 3D model;
      for a holographic image frame of the holographic animation, derive a 2D view of the 3D model with a virtual perspective based on the current pose; and
      texture map a corresponding environmental effect image frame to the 2D view of the 3D model to generate a rendered image frame of the 2D view with texture-mapped environmental effects; and
   a display configured to visually present the rendered image frame.

16. The virtual-reality computing device of claim 15, wherein the render-baked dynamic environmental effect animation simulates a lighting effect.

17. The virtual-reality computing device of claim 15, wherein the render-baked dynamic environmental effect animation simulates a fluid motion effect.

18. The virtual-reality computing device of claim 15, wherein the render-baked dynamic environmental effect animation simulates a gas particle motion effect.

19. The virtual-reality computing device of claim 15, wherein the 3D model includes a plurality of 3D objects, and wherein the rendering tool is configured to texture map the same environmental effect image frame to all of the 3D objects included in the 2D view.

20. The virtual-reality computing device of claim 15, wherein the render-baked dynamic environmental effect animation and the holographic animation have a same frame rate.

* * * * *